(12) United States Patent
Iwahara et al.

(10) Patent No.: US 9,630,573 B2
(45) Date of Patent: Apr. 25, 2017

(54) CLIP MOUNTING SEATS OF INTERIOR COMPONENTS OR EXTERIOR COMPONENTS

(71) Applicant: DAIWA KASEI KOGYO KABUSHIKI KAISHA, Okazaki-shi, Aichi-ken (JP)

(72) Inventors: Toshio Iwahara, Okazaki (JP); Makoto Kato, Toyota (JP); Junya Ukai, Okazaki (JP); Kazuki Fujii, Okazaki (JP)

(73) Assignee: DAIWA KASEI KOGYO KABUSHIKI KAISHA, Aichi-Ken (JP)

( * ) Notice: Subject to any disclaimer, the term of this patent is extended or adjusted under 35 U.S.C. 154(b) by 294 days.

(21) Appl. No.: 14/527,452

(22) Filed: Oct. 29, 2014

(65) Prior Publication Data
US 2015/0113773 A1    Apr. 30, 2015

(30) Foreign Application Priority Data
Oct. 31, 2013 (JP) .................................. 2013-226892

(51) Int. Cl.
| | |
|---|---|
| *F16B 5/06* | (2006.01) |
| *B60R 13/04* | (2006.01) |
| *B60R 13/02* | (2006.01) |
| *F16B 21/08* | (2006.01) |

(52) U.S. Cl.
CPC .......... *B60R 13/04* (2013.01); *B60R 13/0206* (2013.01); *F16B 5/0657* (2013.01); *F16B 5/0664* (2013.01); *F16B 5/065* (2013.01); *F16B 21/086* (2013.01); *Y10T 24/45257* (2015.01)

(58) Field of Classification Search
CPC .. Y10T 24/45257; F16B 5/0657; F16B 5/065; F16B 21/086; F16B 5/0664; B60R 13/0206; B60R 13/04
See application file for complete search history.

(56) References Cited

U.S. PATENT DOCUMENTS 3,700,206 A * 10/1972 Jones ...................... F16K 1/482
24/704.1

FOREIGN PATENT DOCUMENTS

JP    2005-081881 A    3/2005

\* cited by examiner

*Primary Examiner* — Jack W Lavinder
(74) *Attorney, Agent, or Firm* — Christensen, Fonder, Dardi & Herbert PLLC

(57) ABSTRACT

Embodiments of the present invention may include a clip mounting seat having a clip attachment surface, a peripheral wall and an opening. The peripheral wall extends from the clip attachment surface. The opening opens a part of an outer peripheral edge of the clip attachment surface. The clip attachment surface has an attachment hole, a guide groove and a tongue. The guide groove guides an insertion of a neck portion of the clip from the opening into the attachment hole. The tongue protrudes from an edge of the guide groove towards the attachment hole. The tongue is deflected to permit the neck portion to enter from the opening into the attachment hole. When the neck portion moves from the attachment hole toward the opening, the tongue is deflected by the neck portion in a closing direction.

9 Claims, 23 Drawing Sheets

CLIP MOUNTING SEATS OF INTERIOR COMPONENTS OR EXTERIOR COMPONENTS

This application claims priority to Japanese patent application serial number 2013-226892, the contents of which are incorporated herein by reference.

BACKGROUND OF THE INVENTION

Embodiments of the present invention relate to a clip mounting seat of an interior component or an exterior component. For example, a clip is attached to the clip mounting seat to mount the interior or exterior component to a vehicle body panel.

There has been known a clip for mounting an automotive interior component (such as a door trim or an instrument panel) to a vehicle body panel. The interior component has a clip mounting seat on an inner surface thereof. A neck portion of the clip is attached to the clip mounting seat. The neck portion is passed through a guide groove of the interior component before being inserted into an attachment hole of the clip mounting seat. Japanese Laid-Open Patent Publication No. 2005-81881 discloses a clip mounting seat 202 shown in FIG. 27. The clip mounting seat 202 has a pair of tongues 228.

The tongues 228 protrude toward an attachment hole 224 from both edges 226a of a guide groove 226. When the clip 203 moves in a detaching direction from an attachment hole 224, the pair of tongues 228 acts on a neck portion 234c of the clip 203 to provide resistance. As a result, it is possible to suppress inadvertent detachment of the clip 203 from the clip mounting seat 202. It is possible to suppress detachment of an interior component (not shown) due to vibration during traveling of the automobile. When the clip 203 is inserted into the attachment hole 224, the pair of tongues 228 do not act as resistance on the neck portion 234c of the clip 203. Thus, the clip 203 can be easily attached to the clip mounting seat 202.

When the requisite force for detaching the clip 203 from the clip mounting seat 202 (the retaining force) is large, it is difficult to detach the clip 203 from the clip mounting seat 202. When, however, the retaining force is increased, the requisite force for attaching the clip 203 to the clip mounting seat 202 increases.

Therefore, there is a need in the art for a clip mounting seat to which the clip can be easily attached and from which the clip is not easily detached.

SUMMARY OF THE INVENTION

According to an aspect of the invention, certain embodiments of the present invention include a clip mounting seat of an interior component or an exterior component has a clip attachment surface, a peripheral wall, and an opening. The peripheral wall extends from the clip attachment surface. The opening opens a part of an outer peripheral edge of the clip attachment surface. The clip attachment surface has an attachment hole, a guide groove and a tongue. The guide groove guides an insertion of a neck portion of the clip from the opening into the attachment hole. The tongue protrudes from an edge of the guide groove toward the attachment hole. The tongue is deflected to thereby permit the neck portion to enter from the opening into the attachment hole. When the neck portion moves from the attachment hole toward the opening, the tongue is deflected by the neck portion in a closing direction to narrow a passage area used for preventing the neck portion from being detached from the attachment hole.

Thus, the tongue suppresses the movement of the neck portion of the clip from the attachment hole to the opening. As a result, it is possible to suppress inadvertent detachment of the clip from the clip mounting seat. On the other hand, the tongue is deflected so as to cause the neck portion to move from the opening to the attachment hole, allowing the neck portion to move to the attachment hole. Thus, the clip can relatively easily be attached to the clip mounting seat.

According to another aspect of the invention, the tongue may have a first tongue and a second tongue. The first and second tongues are deflected in an opening direction to move away from each other via the neck portion when the neck portion moves from the opening to the attachment hole. The first and second tongues are deflected in the closing direction to move toward each other via the neck portion when the neck portion moves from the attachment hole to the opening.

According to another aspect of the invention, the tongue may have a distal end configured to abut the neck portion when the neck portion moves from the attachment hole to the opening. The distal end is provided with a recess directed toward the attachment hole. Alternatively, the distal end may have an arc shape situated on an arc line in which an inner peripheral edge of the attachment hole is situated. Alternatively, the distal end may be formed in a linear configuration and the distal end may be directed towards the attachment hole.

According to another aspect of the invention, the distal end of the tongue may have a first portion and a second portion. The first portion may have a first angle such that the tongue is deformed to move toward the guide groove via the neck portion when the neck portion moves from the attachment hole to the opening by an applied first force. The second portion may have a second angle such that the tongue is deformed to move away from the guide groove via the neck portion when the neck portion moves from the attachment hole to the opening by an applied second force larger than the applied first force. Thus, it is possible to detach the clip from the clip mounting seat by the second force.

According to another aspect of the invention, the tongue may be provided with a protrusion protruding so as to reduce a groove width of the guide groove. According to another aspect of the invention, the tongue may be deflected by the neck portion moving from the opening toward the attachment hole to abut a groove wall of the guide groove. According to another aspect of the invention, a gap into which the neck portion is inserted when the tongue abuts the groove wall of the guide groove may be smaller than the diameter of the neck portion. Thus, the worker can feel the movement of the neck portion from the guide groove to the attachment hole since the tongue abuts the groove wall of the guide groove. As a result, it is possible to prevent the worker from forgetting to attach the clip to the clip mounting seat.

DETAILED DESCRIPTION OF THE INVENTION

Each of the additional features and teachings disclosed above and below may be utilized separately or in conjunction with other features and teachings to provide improved clip mounting seats for interior components or an exterior components. Representative examples of the present invention, which utilize many of these additional features and teachings both separately and in conjunction with one another, will now be described in detail with reference to the attached drawings. This detailed description is merely intended to teach a person of ordinary skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
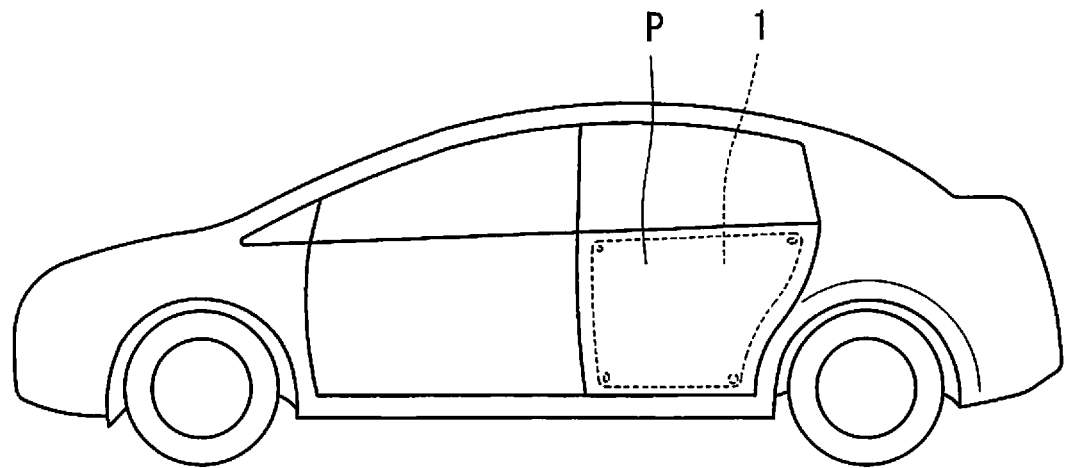
FIG. 1 is a side view of a vehicle having a door trim.
Figure 2:
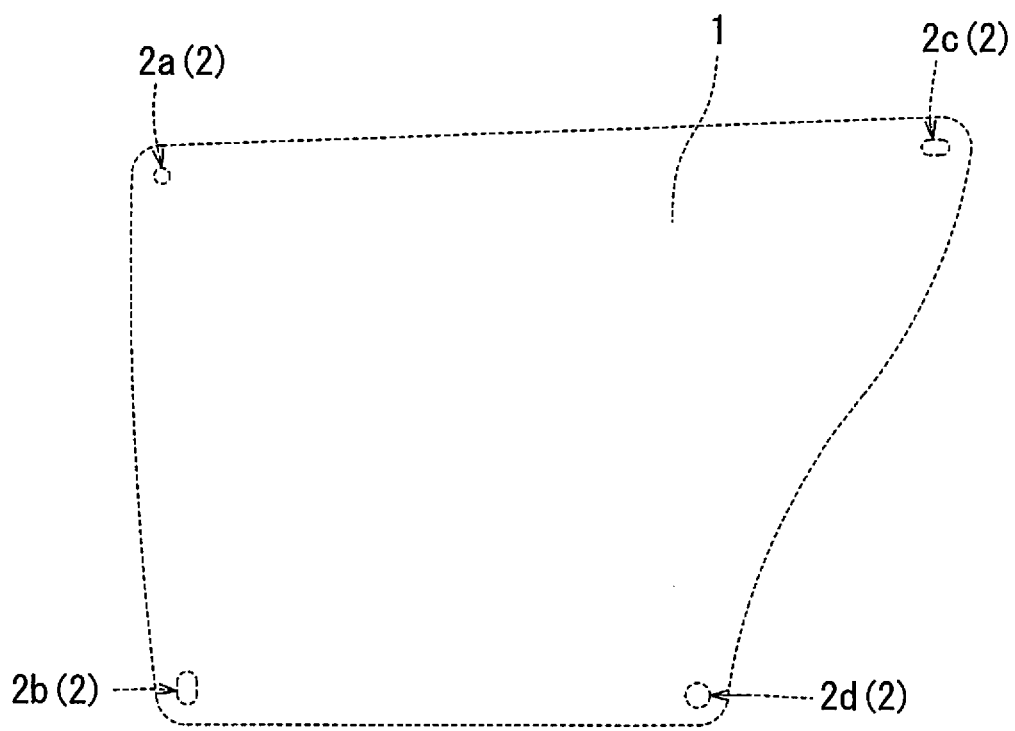
FIG. 2 is a schematic view of the door trim of FIG. 1.

FIGS. 1 to 17 show an embodiment which has an interior component 1 and a clip 3. As shown in FIGS. 1 and 2, the interior component 1 is, for example, a door trim for an automobile. The interior component 1 has an outer surface exhibiting a design property, and an inner surface on the other side of the outer surface. At the four corners of the inner surface, there are formed first to fourth clip mounting seats 2 (2a to 2d) to each of which a clip 3 is attached. The clip 3 has upper and lower flange portions 34a and 34b between which the clip mounting seat 2 is held.

Figure 3:
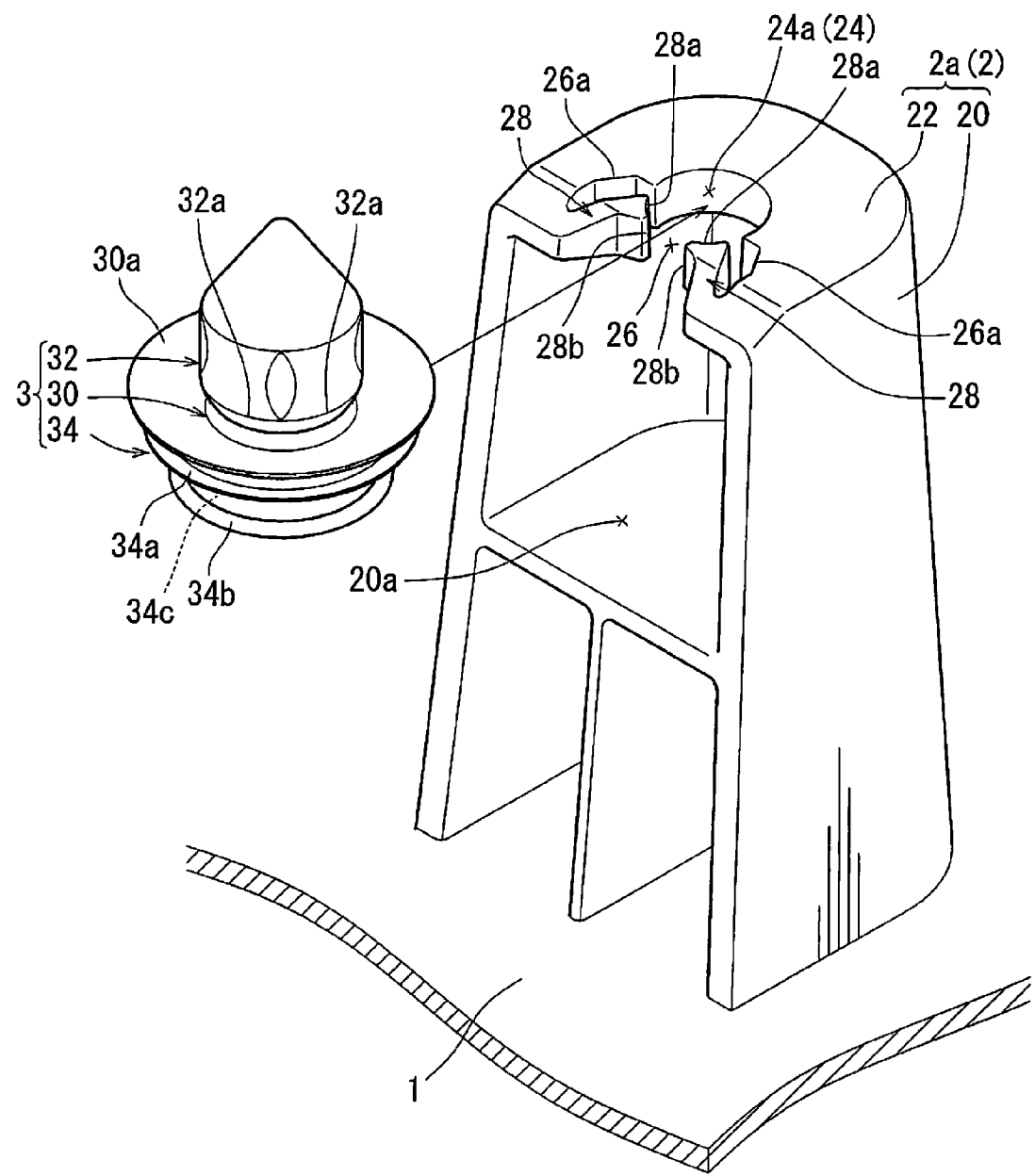
FIG. 3 is a perspective view of a first clip mounting seat of the door trim of FIG. 2 before a clip is attached to the first clip mounting seat.
Figure 4:
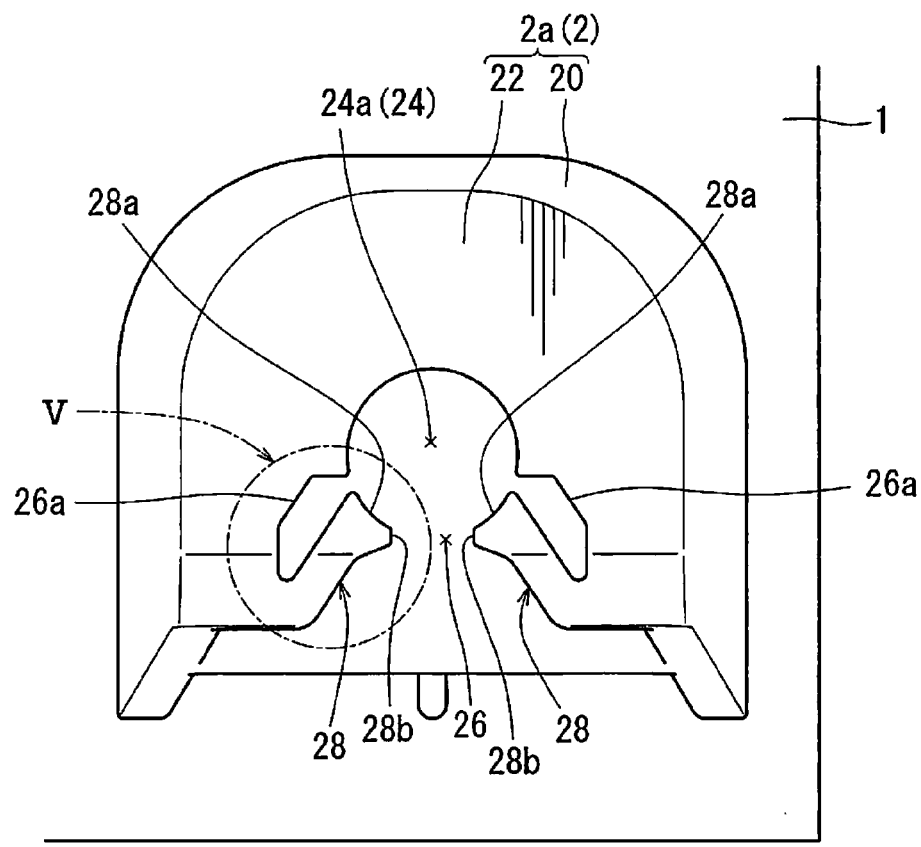
FIG. 4 is a plane view of the first clip mounting seat of FIG. 3.
Figure 5:
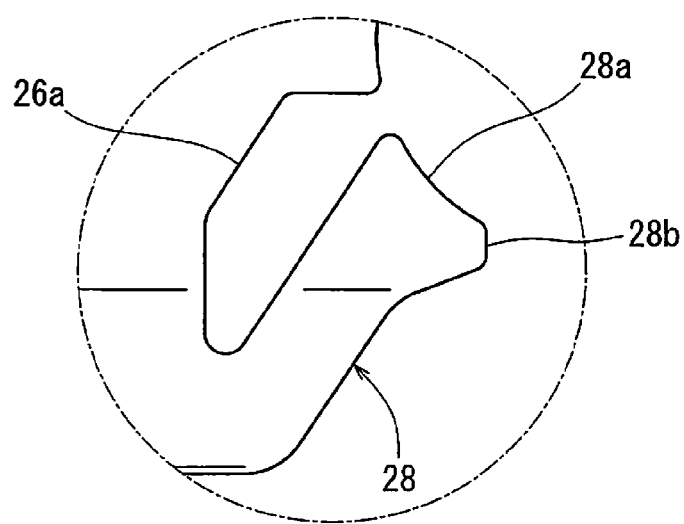
FIG. 5 is an enlarged view of a portion V in FIG. 4.
Figure 6:
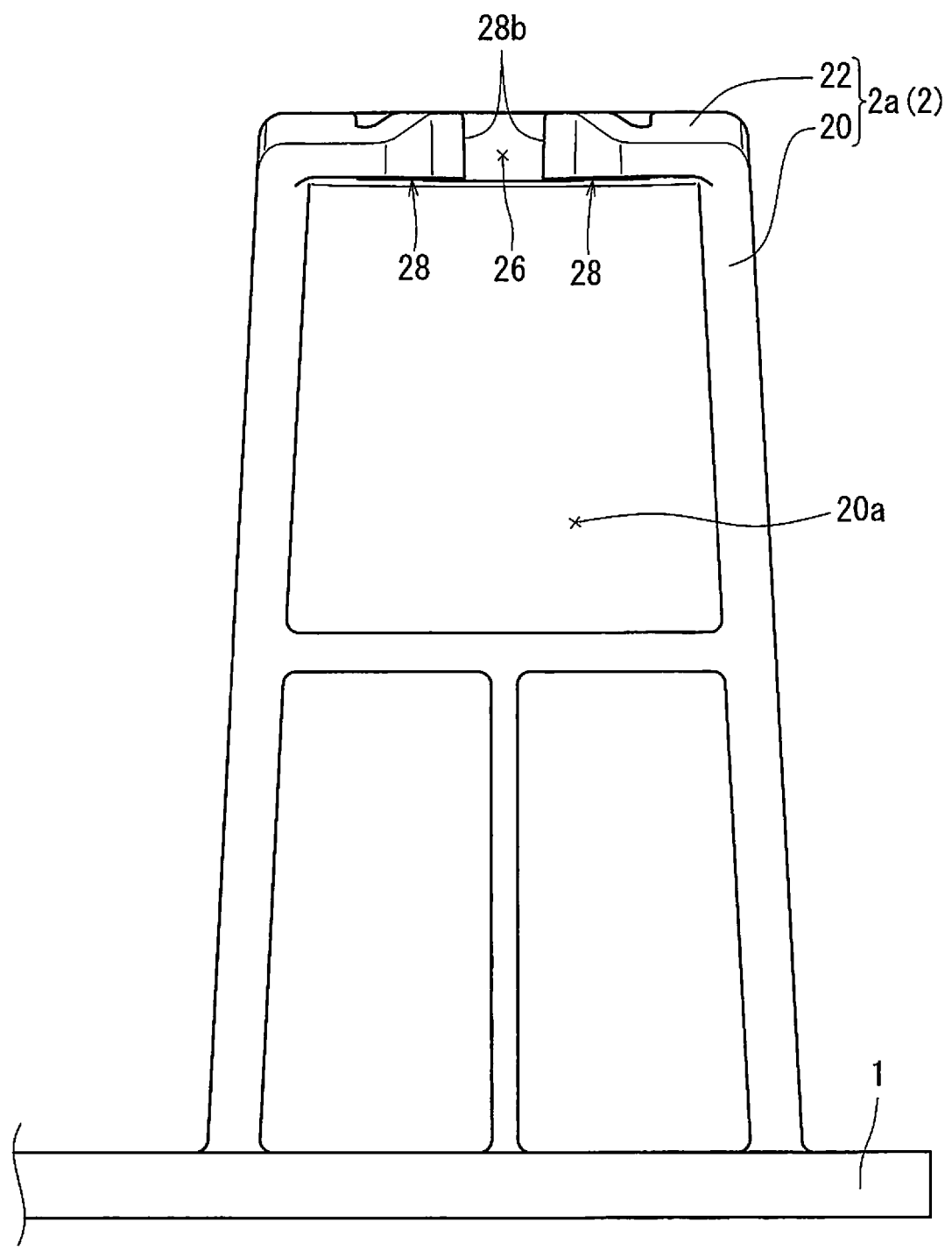
FIG. 6 is a front view of the first clip mounting seat of FIG. 3.
Figure 7:
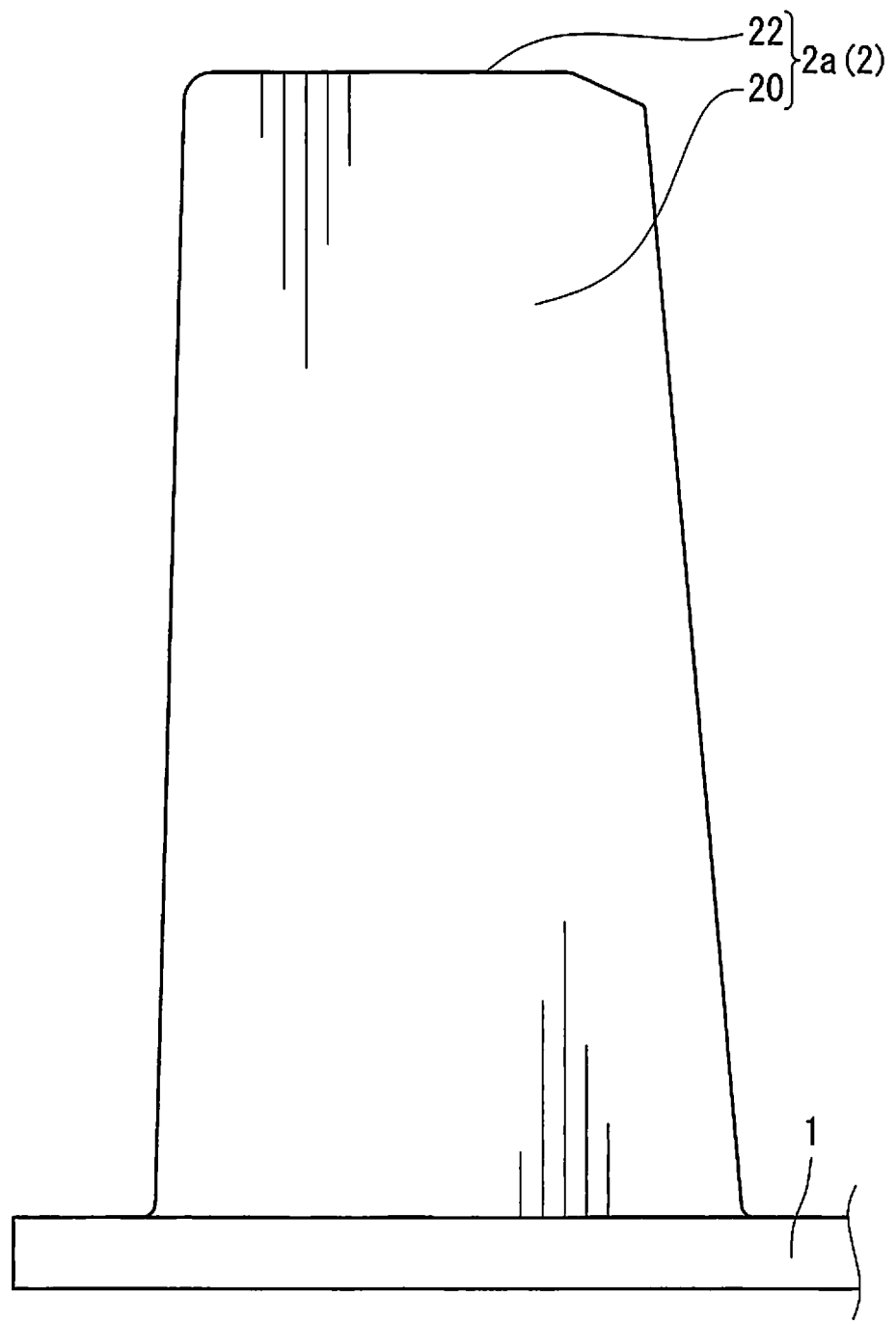
FIG. 7 is a side view of the first clip mounting seat of FIG. 3.
Figure 8:
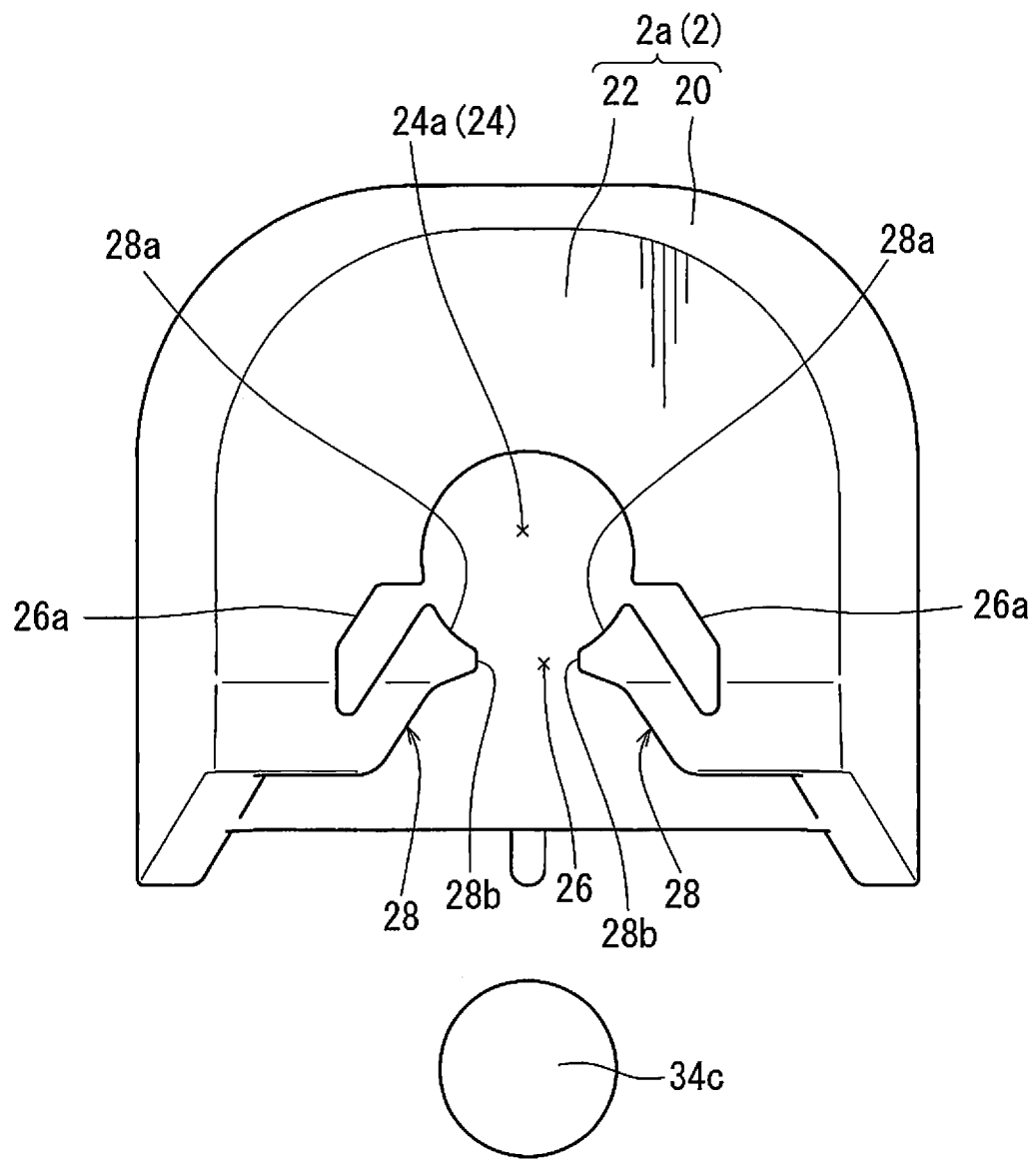
FIG. 8 is a plane view of the first clip mounting seat and a neck portion of the clip before the clip is attached to the first clip mounting seat.

As shown in FIGS. 3 and 4, a first clip mounting seat 2a has a first attachment hole 24a exhibiting an inner diameter slightly larger than the outer diameter of a neck portion 34c of the clip 3. The first attachment hole 24a serves as a reference hole for setting the position of the door trim 1 with respect to a vehicle body panel P. The first attachment hole 24a is set to be of such a size that it cannot absorb a mounting error in the vertical direction and/or the front-rear direction of the door trim 1 with respect to the vehicle body panel P.

Figure 15:
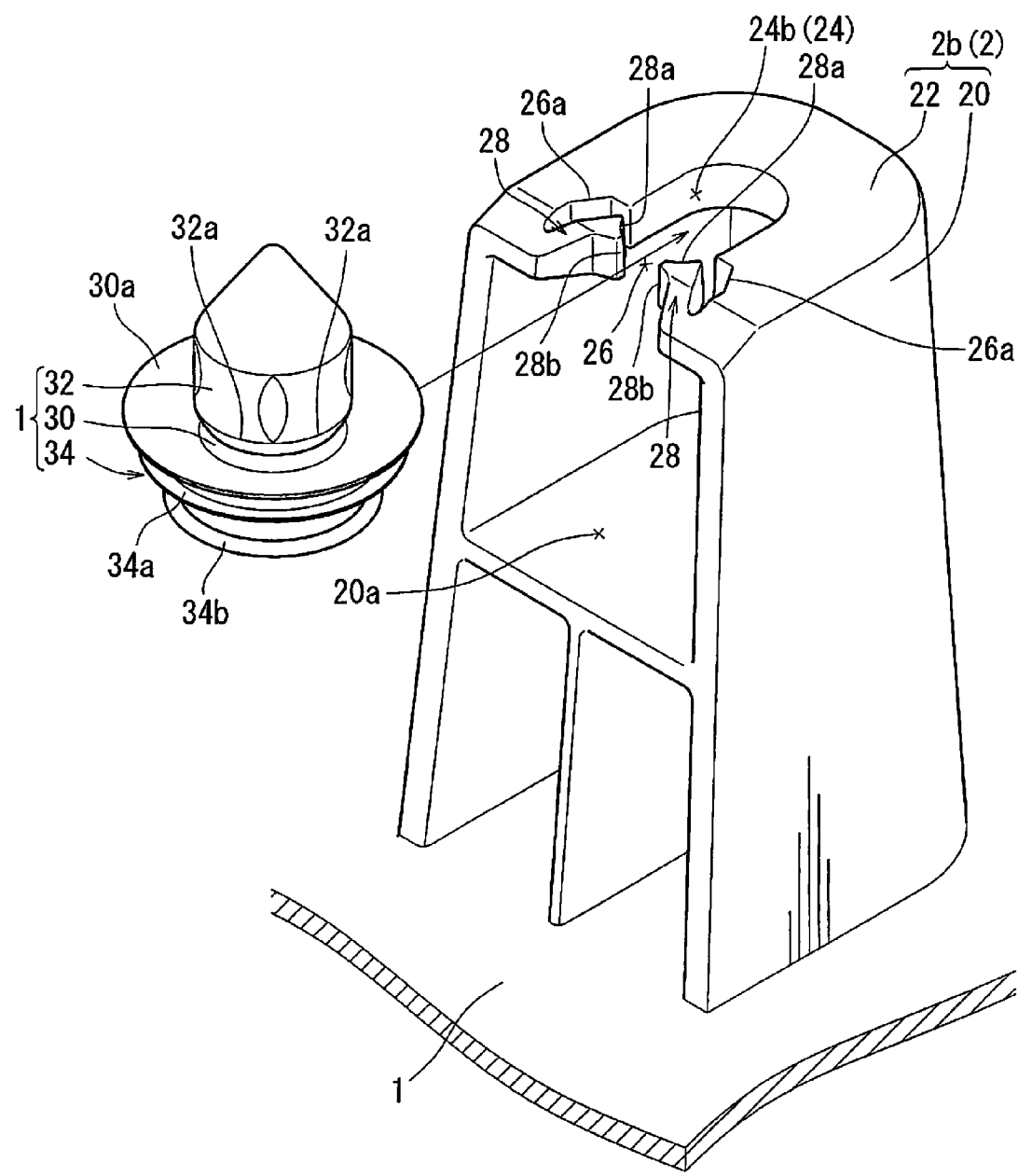
FIG. 15 is a perspective view of a second clip mounting seat of the door trim before a clip is attached to the second mounting seat.
Figure 16:
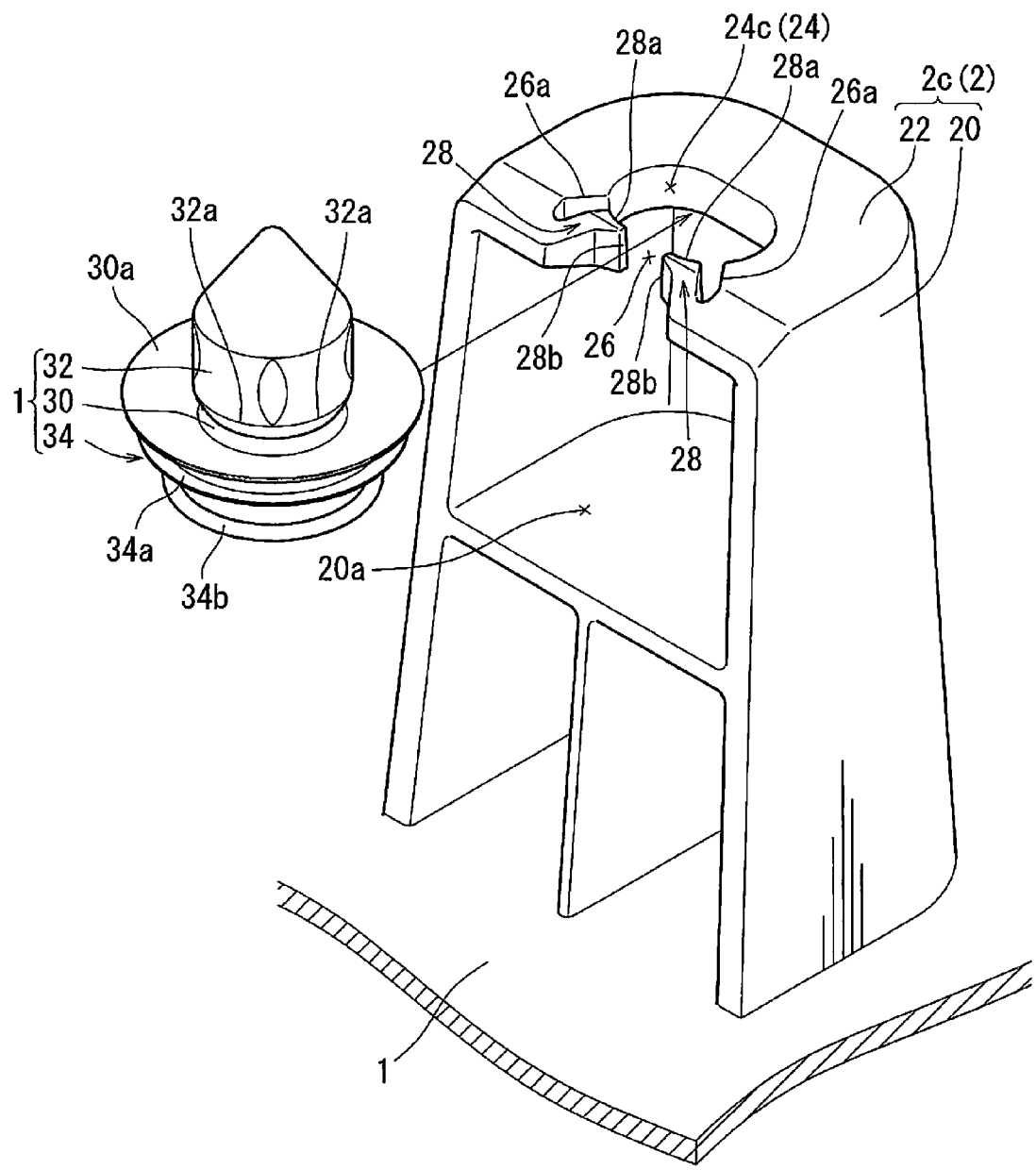
FIG. 16 is a perspective view of a third clip mounting seat of the door trim before a clip is attached to the third mounting seat.
Figure 17:
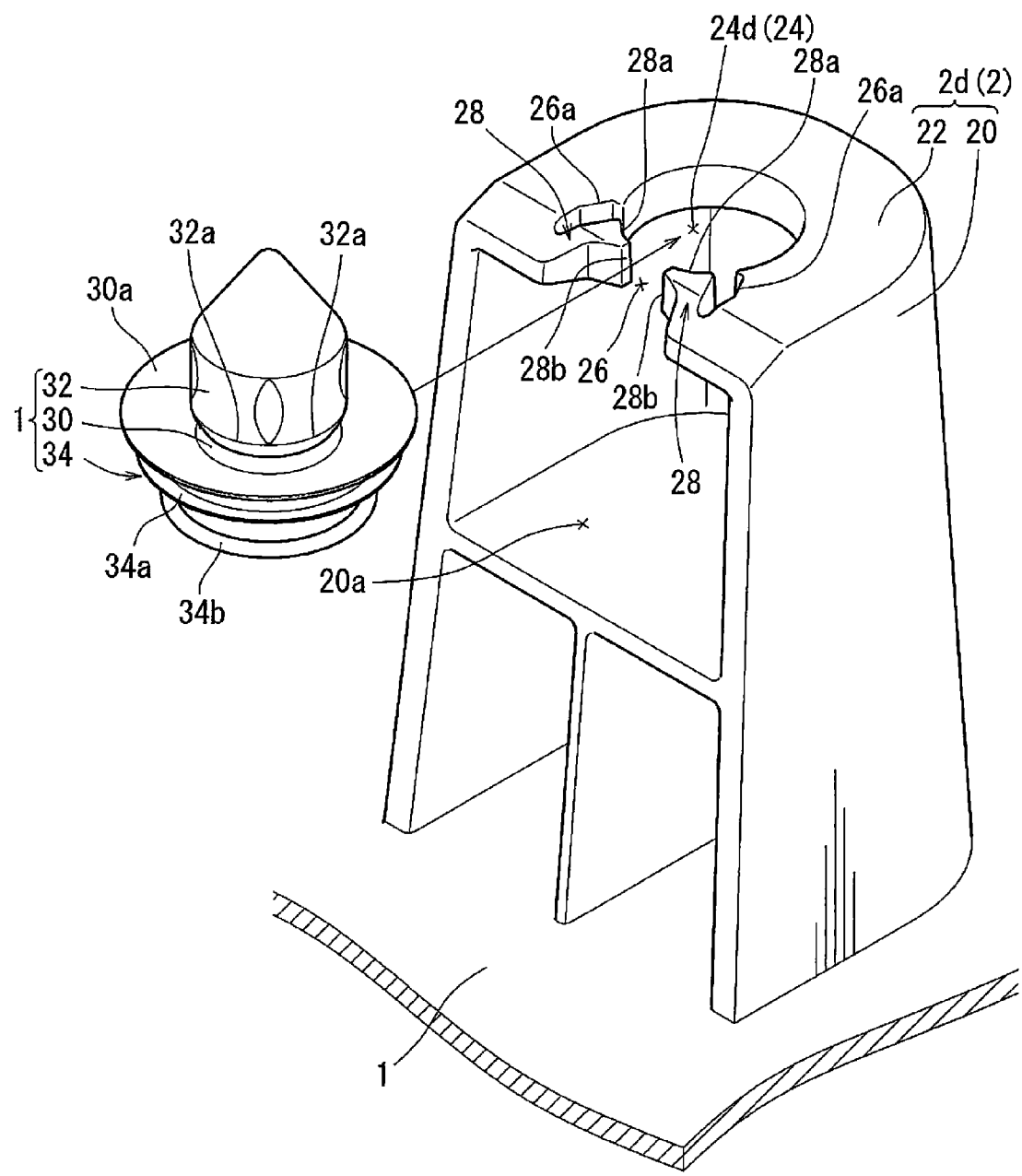
FIG. 17 is a perspective view of a forth clip mounting seat of the door trim before a clip is attached to the forth mounting seat.
Figure 18:
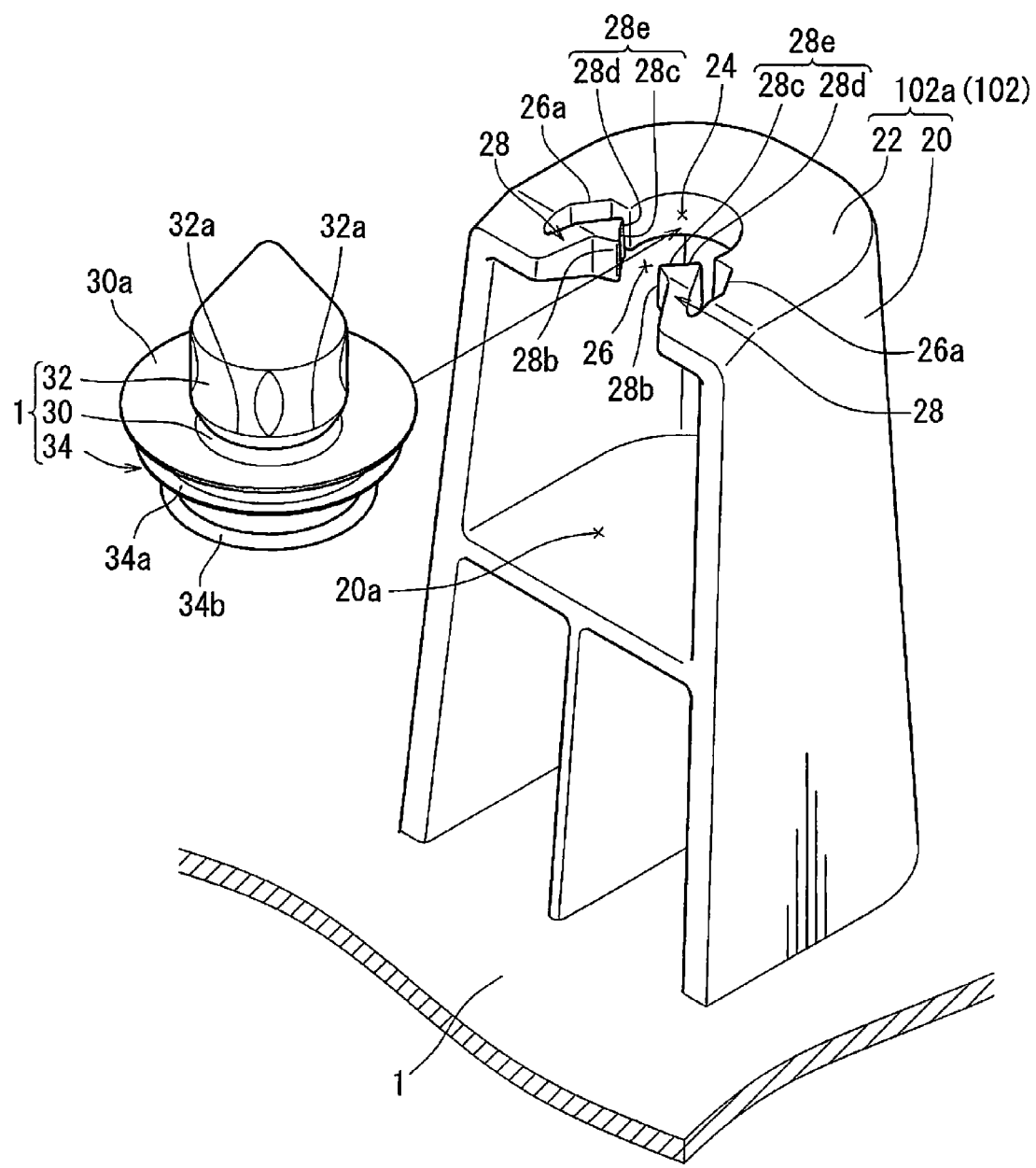
FIG. 18 is a perspective view of another clip mounting seat of the door trim before a clip is attached to the clip mounting seat.

As shown in FIG. 15, a second clip mounting seat 2b has a second attachment hole 24b. The second attachment hole 24b is a longitudinally (vertically) elongated hole capable of absorbing the mounting error in the vertical direction of the door trim 1 with respect to the vehicle body panel P. As shown in FIG. 16, a third clip mounting seat 2c has a third attachment hole 24c. The third attachment hole 24c is a laterally elongated hole capable of absorbing the mounting error in the front-rear direction of the door trim 1 with respect to the vehicle body panel P. As shown in FIG. 17, a fourth clip mounting seat 2d has a fourth attachment hole 24d. The fourth attachment hole 24d has a large diameter allowing absorption of the mounting error in the vertical direction and the front-rear direction of the door trim 1 with respect to the vehicle body panel P.

The first to fourth clip mounting seats 2a to 2d have the attachment holes 24a to 24d which are different from each other. With the exception of the attachment holes 24a to 24d, the first to fourth mounting seats 2a to 2d are of the same construction.

As shown in FIGS. 3 to 7, the first clip mounting seat 2a is formed integrally with the interior component 1. The first clip mounting seat 2a is formed of a synthetic resin exhibiting rigidity. The first clip mounting seat 2a has a peripheral wall 20 and a clip attachment surface 22. The peripheral wall 20 protrudes from the interior component 1. The clip attachment surface 22 is formed so as to close the upper side of the peripheral wall 20.

As shown in FIG. 3, the first clip mounting seat 2a has an opening 20a for opening a part of the peripheral wall 20. The clip attachment surface 22 is provided with a guide groove 26 and a pair of tongues 28. The neck portion 34c of the clip 1 is inserted into the clip attachment surface 22 from the opening 20a, and is guided to the first attachment hole 24a by the guide groove 26. The tongues 28 protrude from both edges 26a of the guide groove 26 toward the first attachment hole 24a.

Figure 9:
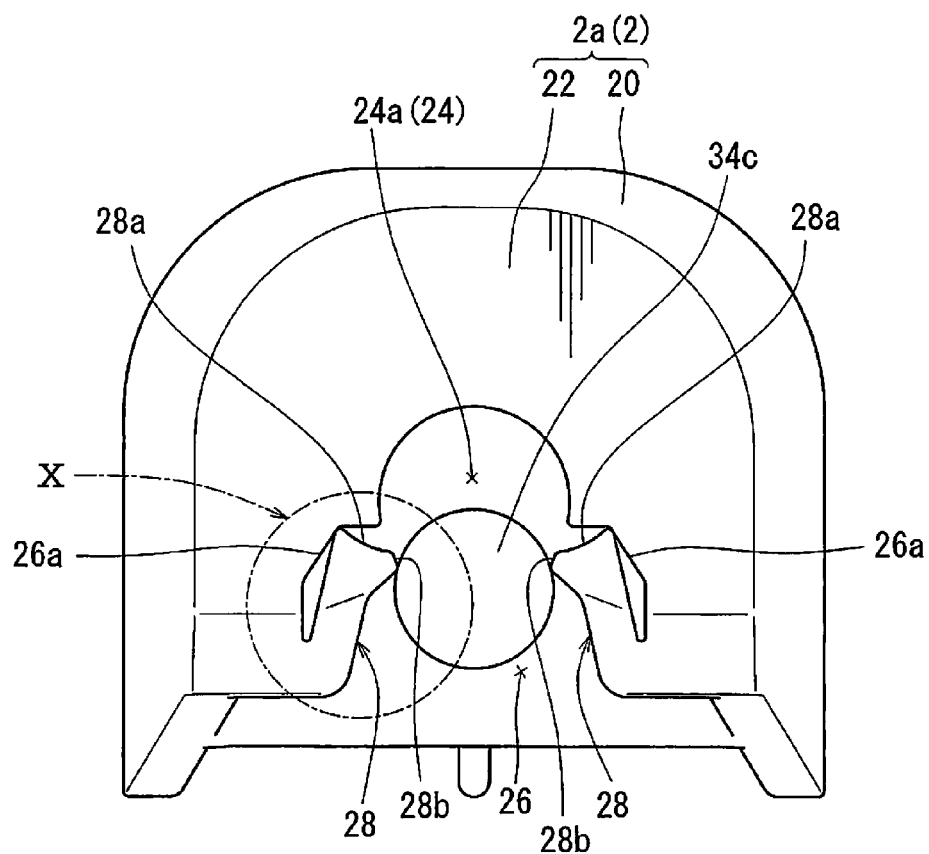
FIG. 9 is a plane view of the first clip mounting seat and the neck portion of the clip when tongues abut the groove walls while the neck portion is inserted into the first clip mounting seat.
Figure 10:
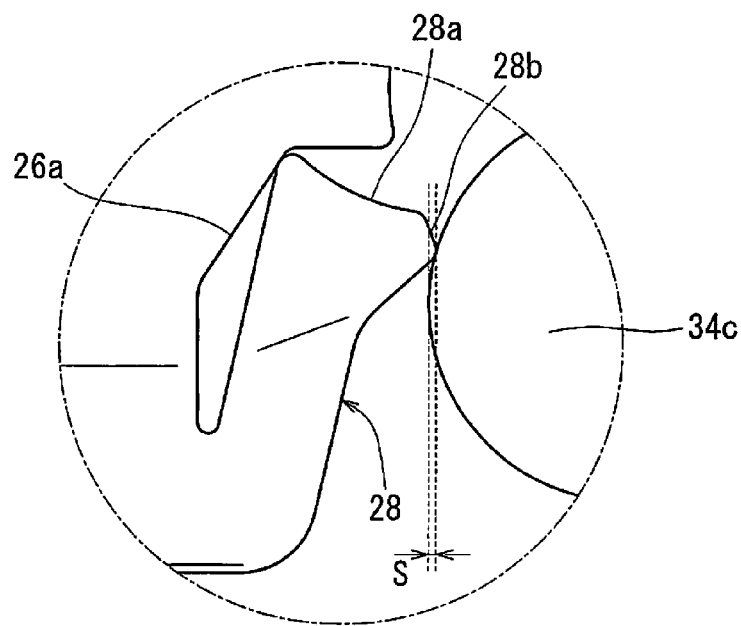
FIG. 10 is an enlarged view of a portion X in FIG. 9.
Figure 11:
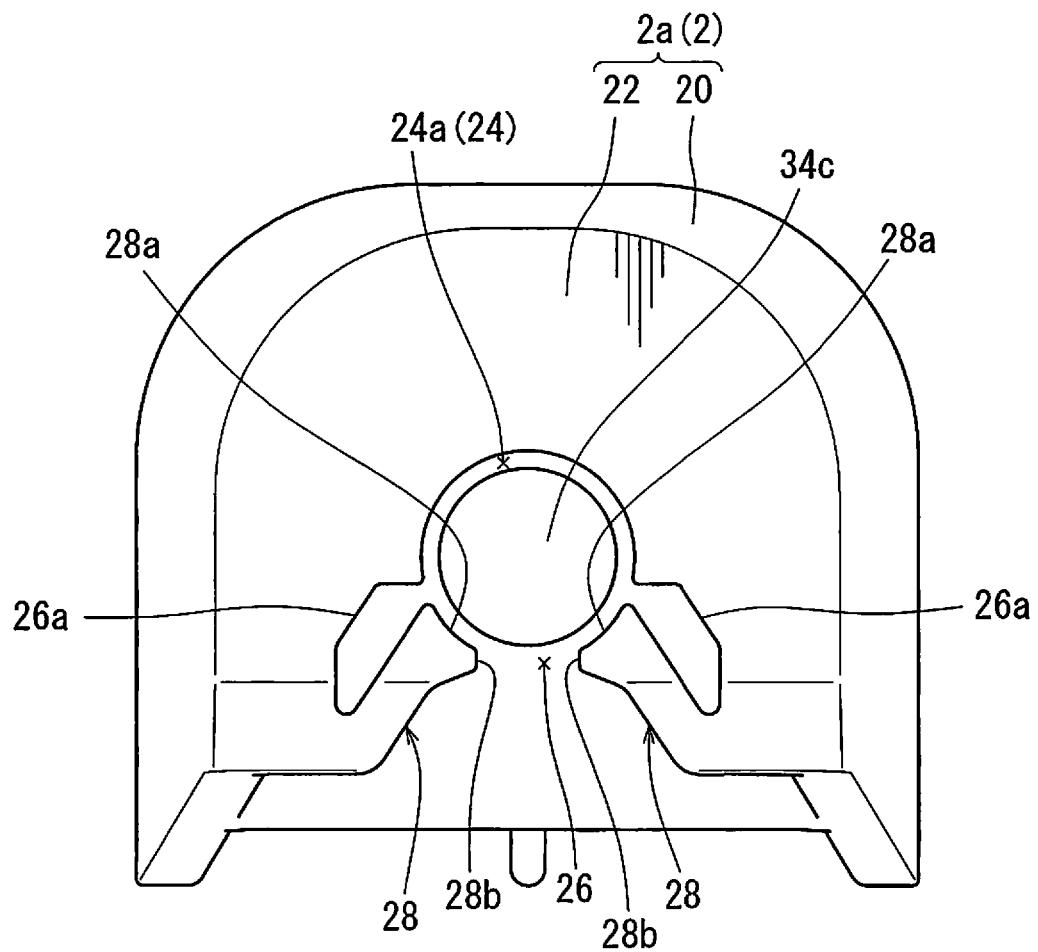
FIG. 11 is a plane view of the first clip mounting seat to which the neck portion of the clip is completely attached.

Each tongue 28 has a distal end 28a and a protrusion 28b. The distal end 28a has an arcuate recess. The distal end 28a is situated on the same arc line of the inner peripheral surface of the first attachment hole 24a. The distal end 28a is an arc of substantially the same radius as the first attachment hole 24a. The protrusions 28b protrude into the guide groove 26 so as to reduce the groove width of the guide groove 26. The distance between the two protrusions 28b is smaller than the outer diameter of the neck portion 34c of the clip 3. As shown in FIGS. 9 to 11, the pair of tongues 28 are deflected, and the neck portion 34c of the clip 3 passes between the pair of tongues 28 to reach the bottom of the first attachment hole 24a. The pair of tongues 28 are restored from deformation, and the distance between the two protrusions 28b becomes smaller than the outer diameter of the neck portion 34c of the clip 3.

As shown in FIG. 3, the clip 3 is a single member formed of a synthetic resin exhibiting rigidity. The clip 3 integrally has a base plate body 30, an anchor body 32 and an attachment body 34. The base plate body 30 is of a disc-like configuration, and constitutes the base of the clip 3. The anchor body 32 protrudes from the upper surface of the base plate body 30. The attachment body 34 protrudes from the lower surface of the base plate body 30. A stabilizer 30a is formed in the outer periphery of the base plate body 30. The stabilizer 30a is formed as a disc upwardly extending from the entire periphery of the base plate body 30.

The anchor body 32 is inserted into a mounting hole (not shown) of the vehicle body panel. On the outer periphery of the anchor body 32, there are formed a plurality of (e.g., four) elastic claws 32a. The anchor body (swollen body) 32 is reduced in diameter when it is inserted into the mounting hole of the vehicle body panel, and it is increased in diameter when reaching beyond the mounting hole. The anchor body 32 is engaged with the mounting hole of the vehicle body panel. As a result, the door trim 1 is mounted to the vehicle body panel.

The attachment body 34 has flange portions (an upper flange portion 34a and a lower flange portion 34b) and the neck portion. The upper flange portion 34a and the lower flange portion 34b hold the clip attachment surface 22 of the first clip mounting seat 2a therebetween. The neck portion 34c is of a small diameter and connects the upper and lower flange portions 34a and 34b to each other.

For attaching the clip 3 to the first clip mounting seat 2a, the anchor body 32 of the clip 3 is first gripped with fingers. The neck portion 34c is inserted into the guide groove 26 while causing the clip attachment surface 22 to be situated between the flange portions 34a and 34b. As shown in FIGS. 9 and 10, the neck portion 34c pushes the protrusions 28b of the pair of tongues 28. The pair of tongues 28 are deflected so as to move away from each other. The pair of tongues 28 contact both edges 26a of the guide groove 26 (abutment state).

In the abutment state, the distance between the two protrusions 28b is smaller than the outer diameter of the neck portion 34c of the clip 3. A distance S is generated between the tangent extending from the neck portion 34c and the distal end line extending from the distal end of each protrusion 28b. In the abutment state, the neck portion 34c is further pushed toward the attachment hole 24. The neck portion 34c deflects the distal end of each protrusion 28b. The neck portion 34c goes beyond the distal end of each protrusion 28b (the distal end line of FIG. 10). The neck portion 34c is attached to the attachment hole 24 of the clip attachment surface 22 (See FIG. 11).

As a result, the clip 3 is attached to the first clip mounting seat 2a of the interior component 1. When inserting the neck portion 34c into the attachment hole 24a, the pair of tongues 28 are deformed. Thus, the clip 3 can be mounted to the clip mounting seat 2a relatively easily.

As shown in FIG. 11, the clip 3 attached to the clip mounting seat 2a is retained on the clip mounting seat 2a by a predetermined retaining force. An external force is applied to the clip 3, and the neck portion 34c moves from the attachment hole 24 to the guide groove 26. The neck portion 34c abuts the distal end 28a of the tongues 28.

Figure 12:
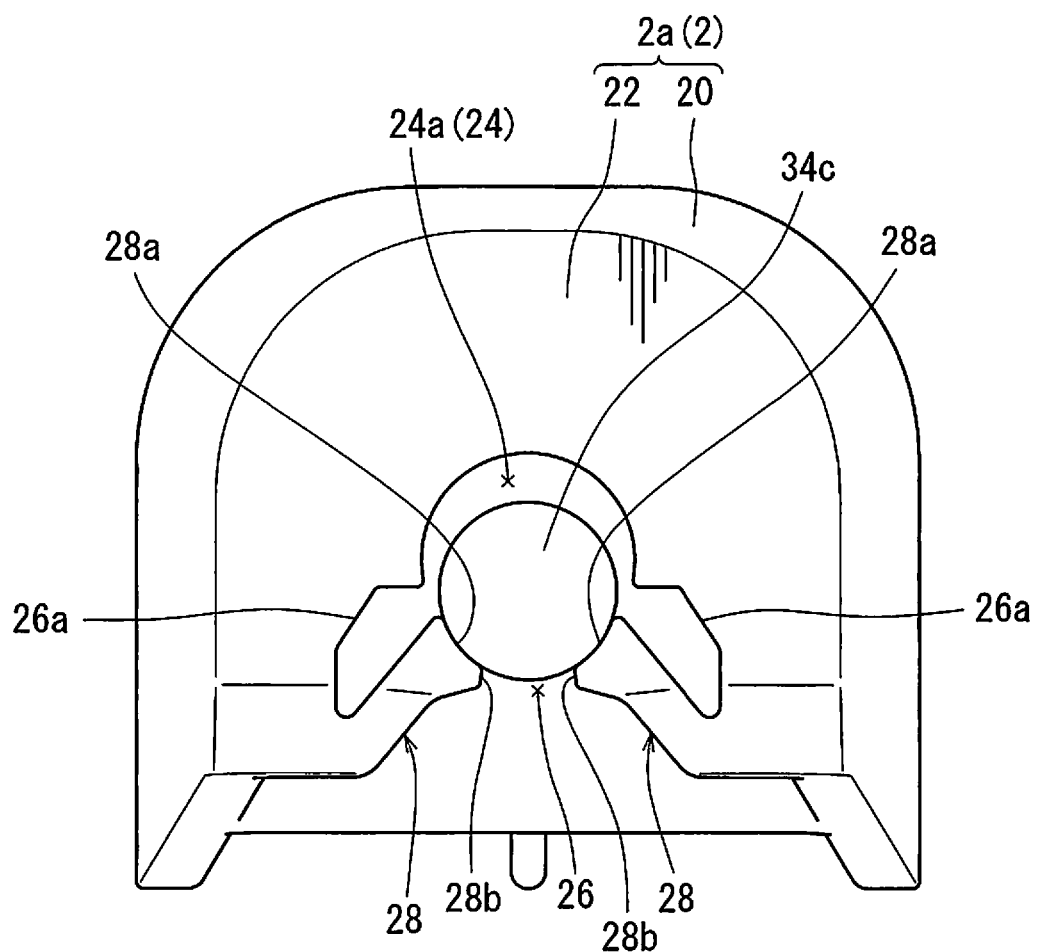
FIG. 12 is a plane view of the first clip mounting seat and the neck portion when a first force is applied on the clip in a detaching direction.

The distal end 28a of the tongues 28 are of substantially the same arcuate configuration as the inner peripheral surface of the attachment hole 24. Thus, the distal end 28a of the tongues 28 effectively receive the neck portion 34c. As shown in FIG. 12, the tongues 28 are deflected so as to move toward each other to stop the advancement of the neck portion 34c. As a result, the tongues 28 act as sufficient resistance to the movement of the neck portion 34c. The tongues 28 can reliably suppress inadvertent detachment of the clip 3.

Figure 13:
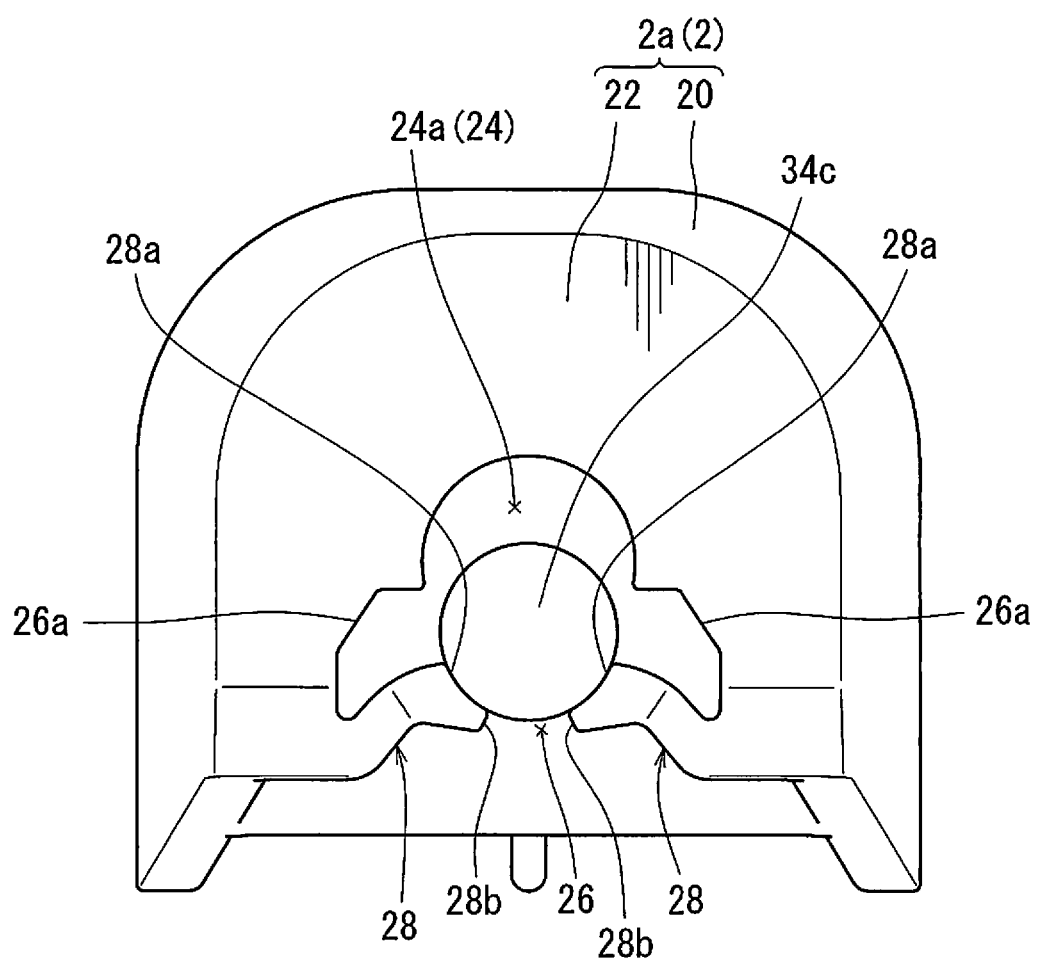
FIG. 13 is a plane view of the first clip mounting seat and the neck portion when a second force, that is greater than the first force, is applied on the clip in the detaching direction.

As shown in FIG. 13, the larger the external force applied to the clip 3, the further the tongues 28 are deflected, and the smaller the distance between the tongues 28. As a result, inadvertent detachment of the clip 3 can be suppressed more securely.

Figure 14:
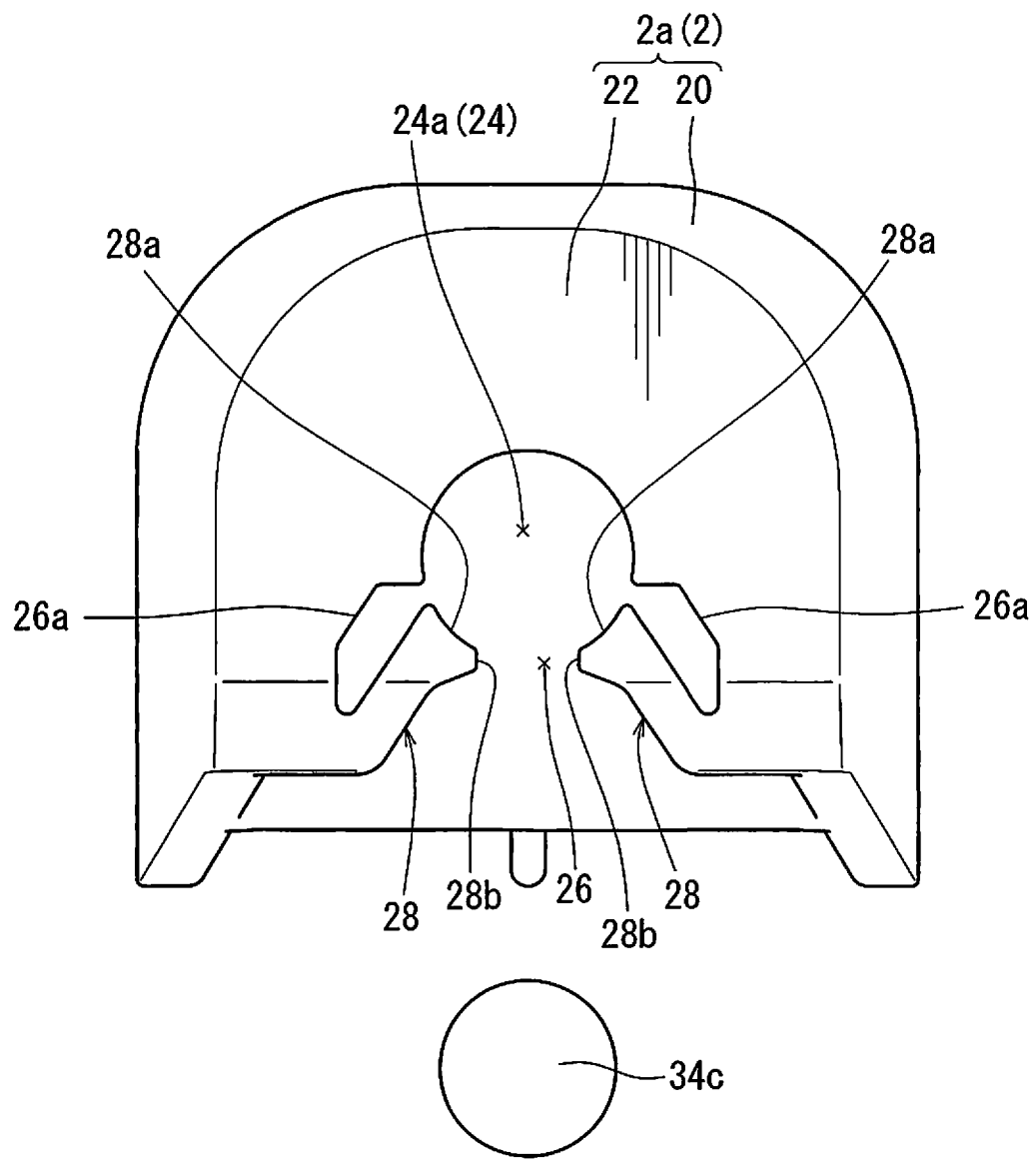
FIG. 14 is a plane view of the first clip mounting seat and the neck portion detached from the first clip mounting seat.

When a force larger than the retaining force is applied to the clip 3, the neck portion 34c further deforms the tongues 28. The tongues 28 move away from each other, and the neck portion 34c passes between the tongues 28. As a result, as shown in FIG. 14, the neck portion 34c passes through the guide groove 26, and is detached from the clip attachment surface 22. The clip 3 is removed from the first clip mounting seat 2a of the interior component 1.

As described above, the clip attachment surface 22 is provided with the attachment hole 24 (24a, 24b, 24c or 24d), the guide groove 26 and the pair of tongues 28. The distal end 28a of the tongues 28 are of the same arcuate configuration as the inner peripheral surface of the attachment hole 24. When the clip 3 receives a force in the detaching direction, the distal ends 28a of the tongues 28 receive the neck portion 34c.

The pair of tongues 28 are deflected so as to move towards each other (See FIG. 12). The tongues 28 move forward, i.e., in the direction in which the neck portion 34c is detached from the attachment hole 24. Thus, the tongues 28 offer resistance to the movement of the neck portion 34c, and inadvertent detachment of the clip 3 from the clip mounting seat 2a is suppressed. When attaching the clip 3 to the clip mounting seat 2a, the tongues 28 are deflected. Thus, the clip 3 can be attached to the clip mounting seat 2a relatively easily.

As shown in FIG. 4, the tongues 28 have the protrusions 28b protruding so as to reduce the groove width of the guide groove 26. As shown in FIG. 9, in the state in which the deflected tongues 28 abut both edges 26a of the guide groove 26, the distance between the protrusions 28b is smaller than the diameter of the neck portion 34c. When attaching the clip 3 to the first clip mounting seat 2a, the neck portion 34c is inserted toward the attachment hole 24, and the neck portion 34c goes beyond the distal ends of the protrusions 28b of the tongues 28. As a result, the worker can feel the attachment of the clip 3 to the clip mounting seat 2a from the fingers with which the anchor body 32 is gripped. As a result, it is possible to prevent the worker from forgetting to attach the clip 3 to the clip mounting seat 2a.

Figure 19:
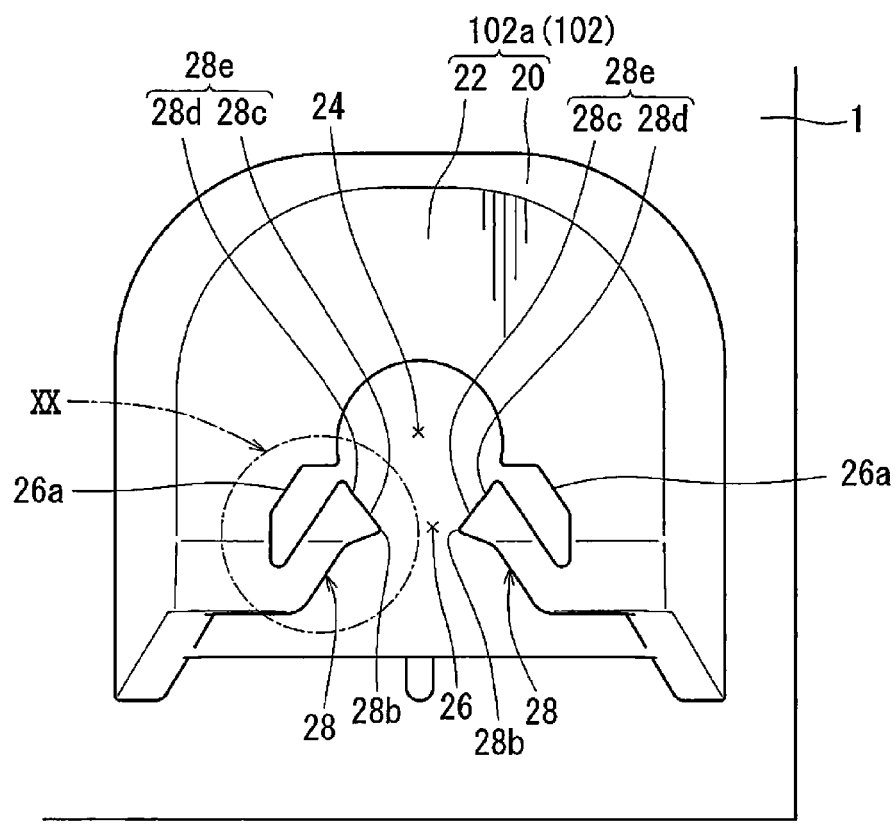
FIG. 19 is a plane view of the clip mounting seat of FIG. 18.
Figure 20:
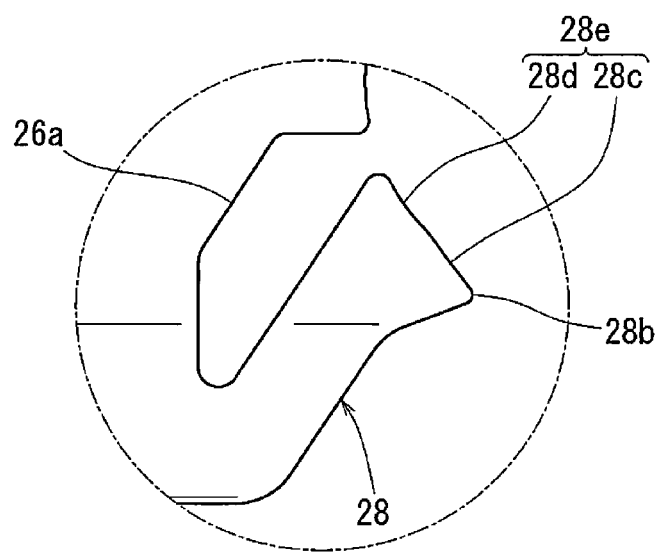
FIG. 20 is an enlarged view of a portion XX in FIG. 19.
Figure 21:
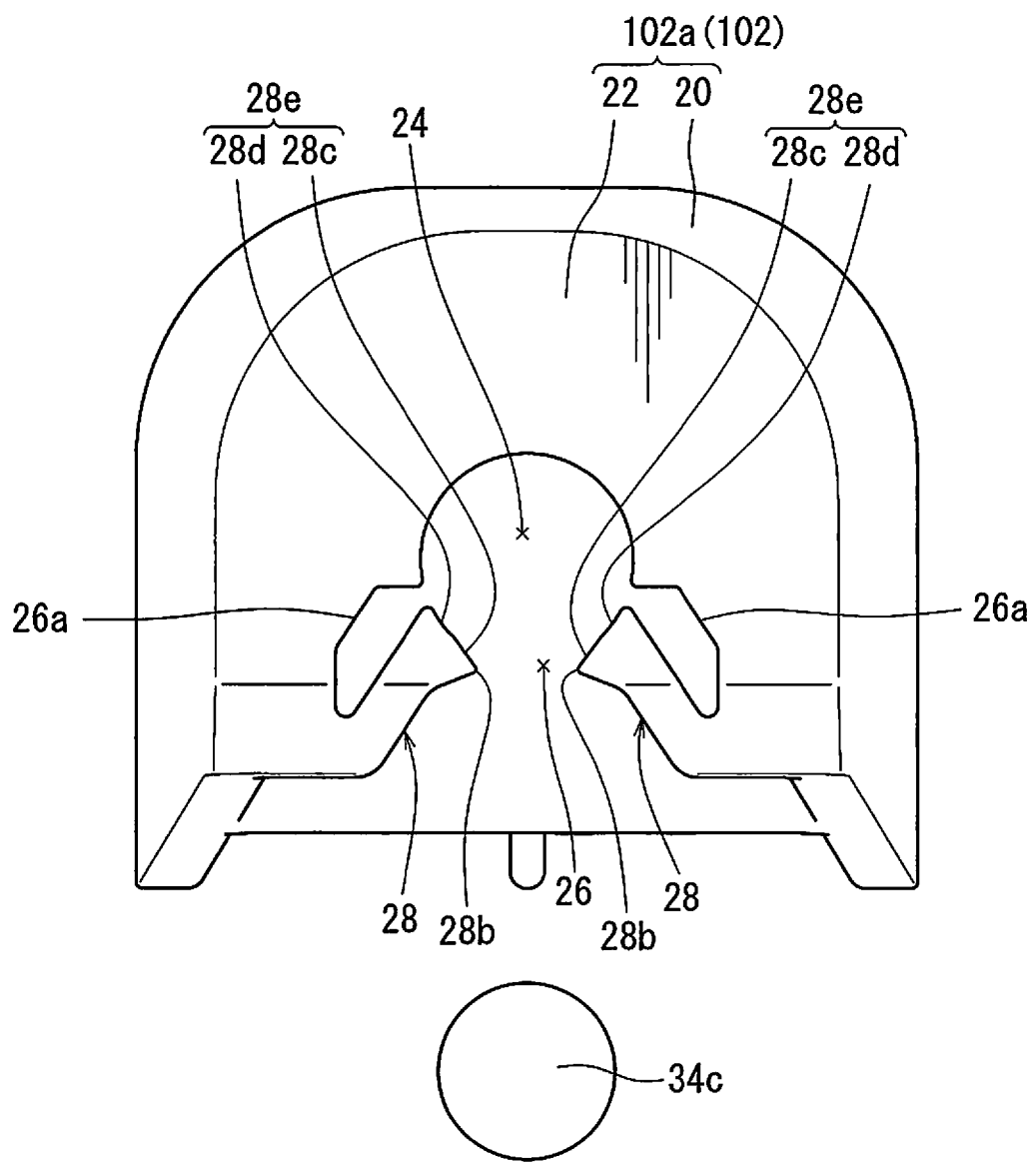
FIG. 21 is a plane view of the clip mounting seat of FIG. 15 and a neck portion of the clip before the clip is attached to the clip mounting seat.
Figure 22:
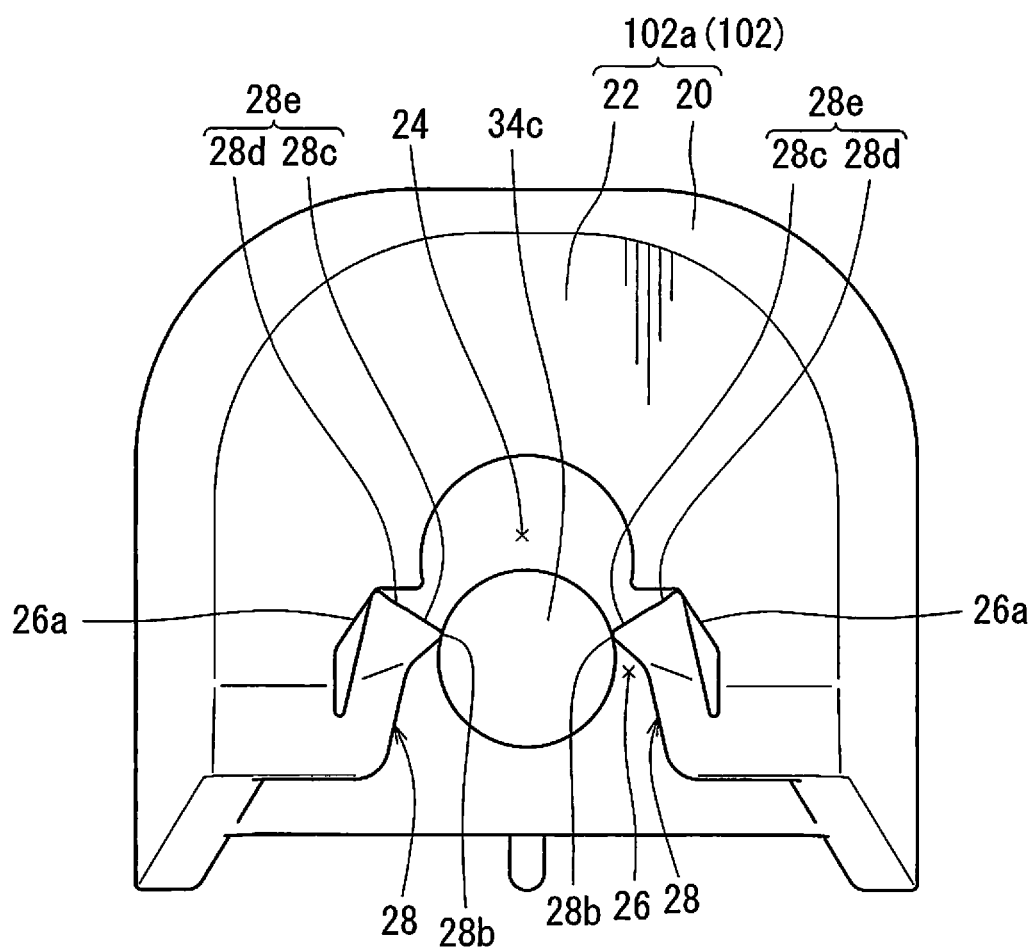
FIG. 22 is a plane view of the clip mounting seat of FIG. 21 and the neck portion of the clip when tongues abut the groove walls while the neck portion is inserted into the clip mounting seat.
Figure 23:
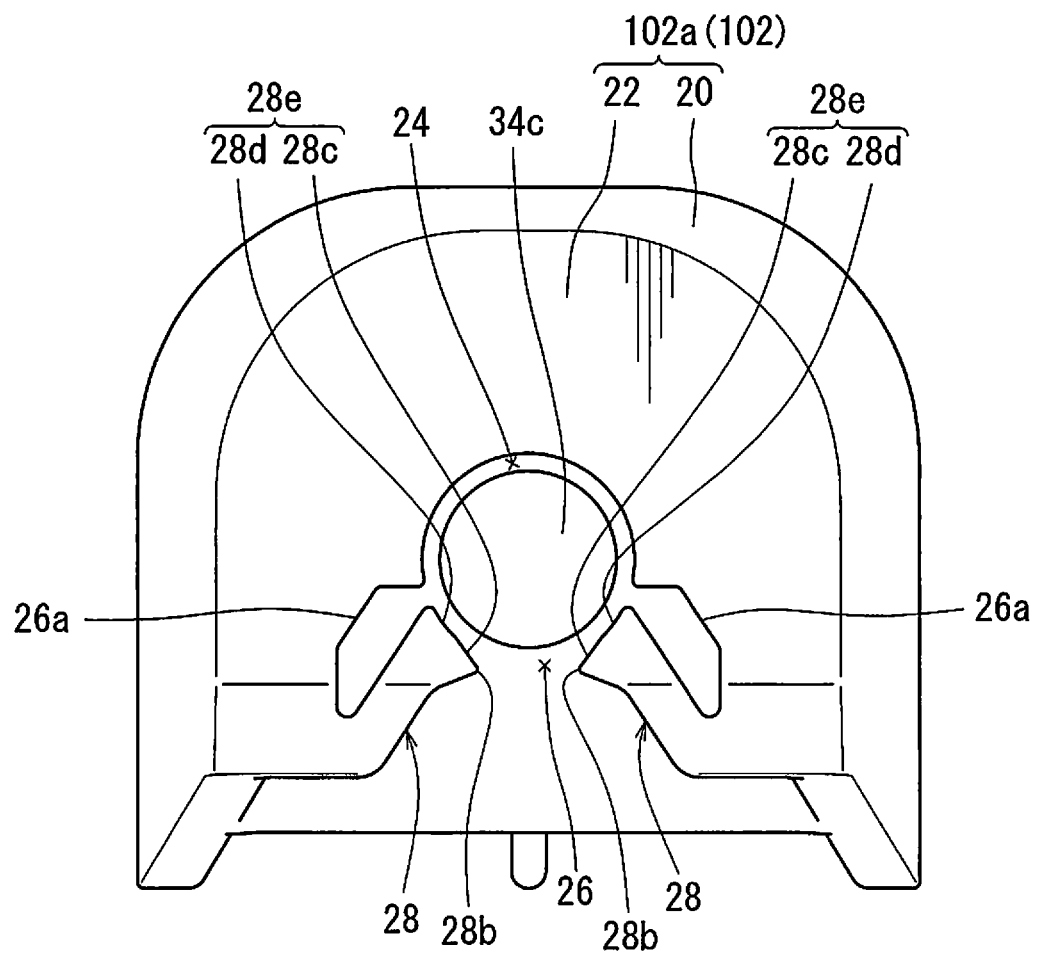
FIG. 23 is a plane view of the clip mounting seat of FIG. 21 when the neck portion is completely attached to the clip mounting seat.
Figure 24:
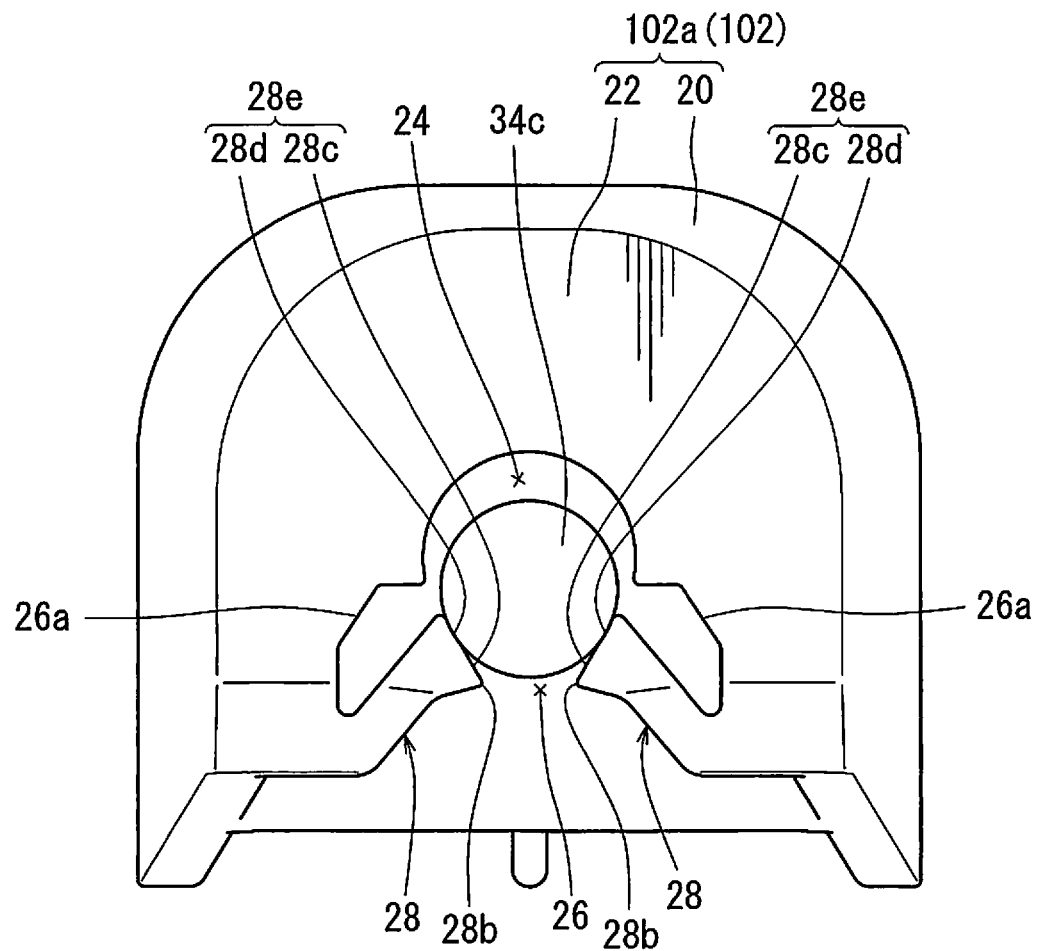
FIG. 24 is a plane view of the clip mounting seat of FIG. 21 and the neck portion when a first force is applied on the clip in a detaching direction.
Figure 25:
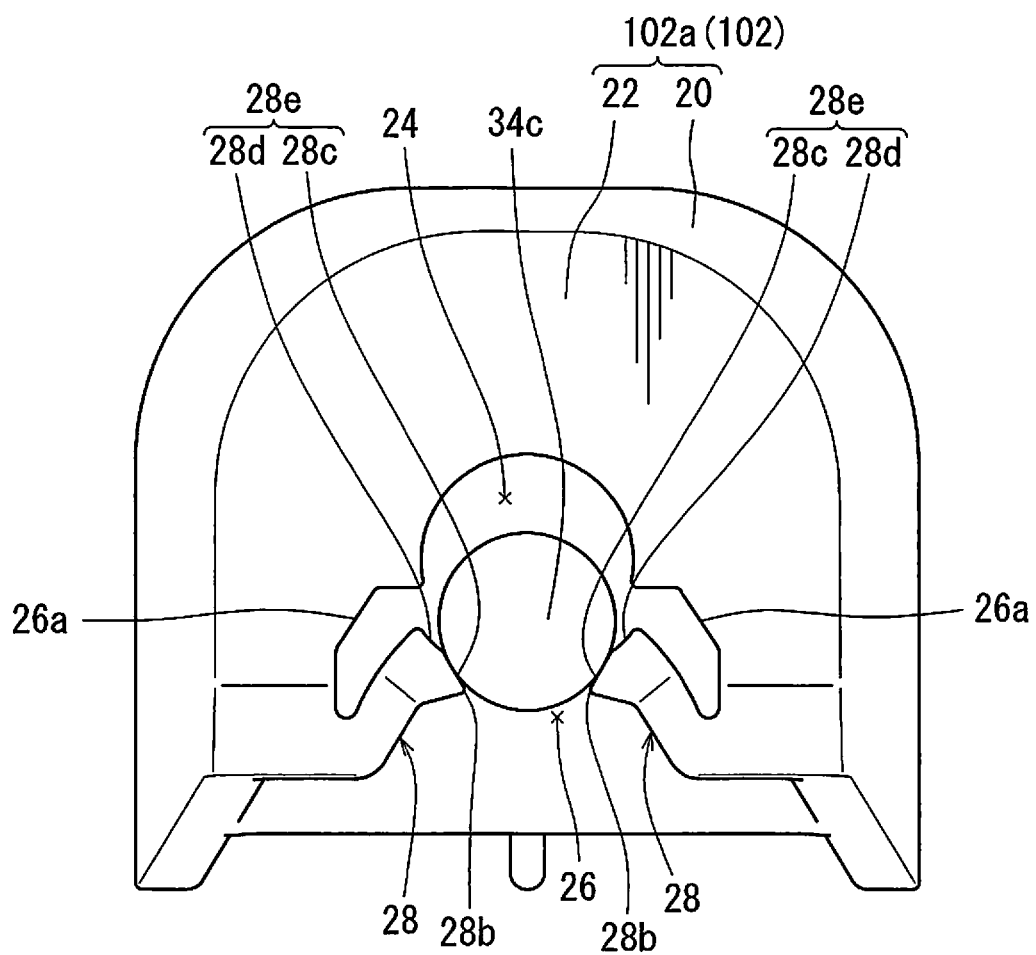
FIG. 25 is a plane view of the clip mounting seat of FIG. 21 and the neck portion when a second force, that is greater than the first force, is applied on the clip in the detaching direction.
Figure 26:
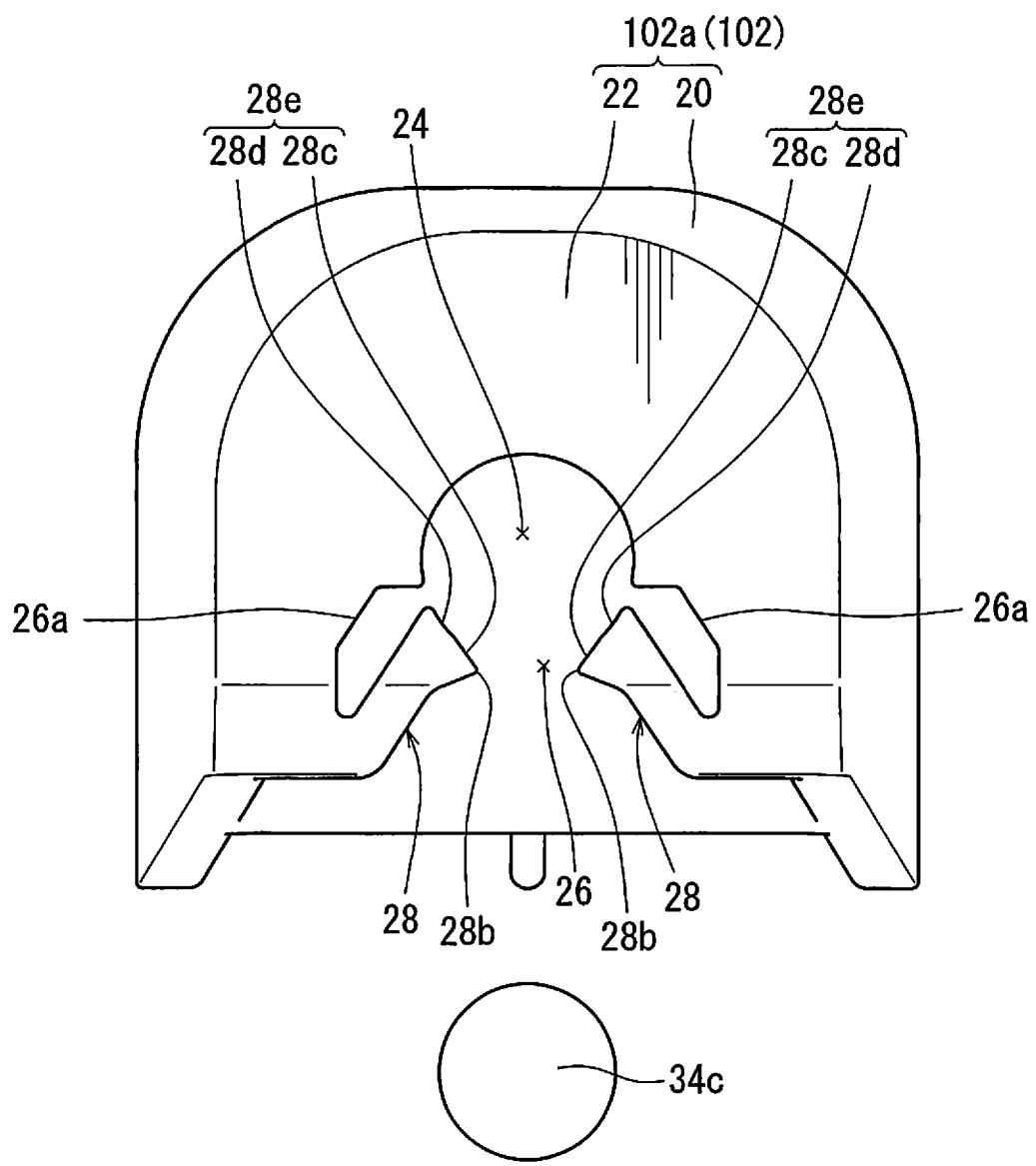
FIG. 26 is a plane view of the clip mounting seat of FIG. 21 and the neck portion detached from the clip mounting seat.
Figure 27:
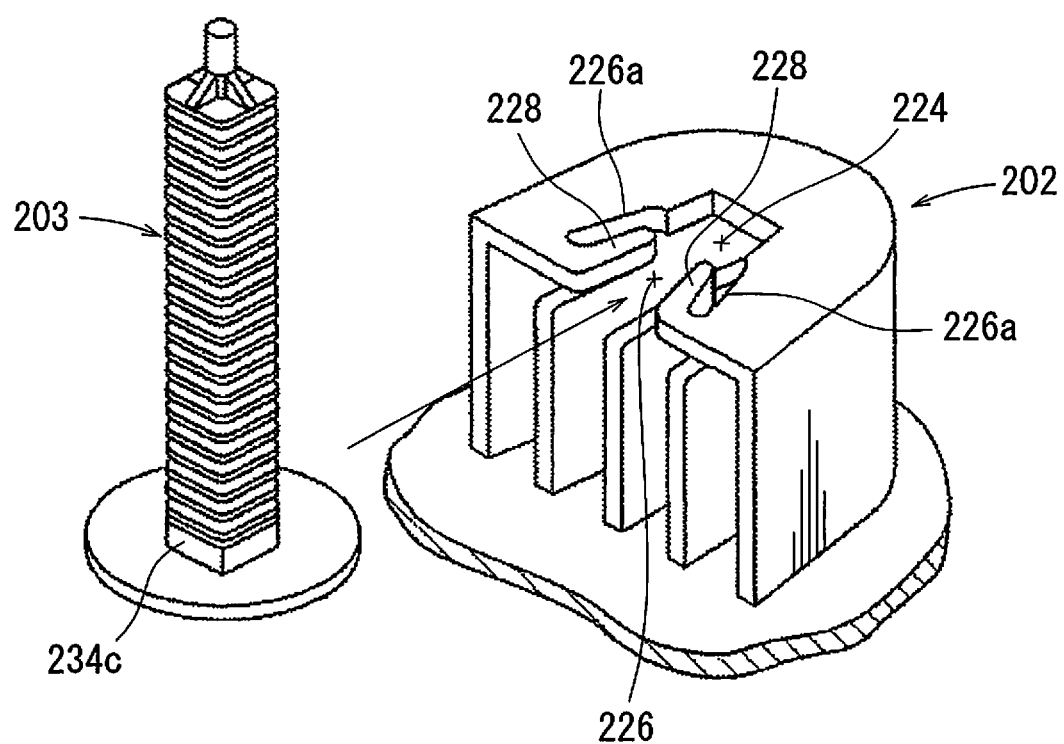
FIG. 27 is a perspective view of a conventional clip mounting seat and a clip before the clip is attached to the clip mounting seat.

FIGS. 18 to 26 show a clip mounting seat 102 which allows the clip 3 to be detached for maintenance more easily than the clip mounting seat 2 shown in FIGS. 3 to 17. The tongues 28 of the clip mounting seat 102 have distal ends 28e as shown in FIG. 19 instead of the distal end 28a shown in FIG. 4. The distal ends 28e are substantially linear, and are directed to the center of the attachment hole 24.

Each distal end 28e has a first portion 28c near the guide groove 26 and a second portion 28d far from the guide groove 26. The second portion 28d extends near the extension of the arcuate line at the inner peripheral surface of the attachment hole 24. The first portion 28c extends on the outer side of the extension of the arcuate line. As a result, the distal ends 28e can also cause the same effect as the distal end 28a shown in FIG. 4.

As shown in FIGS. 23 to 26, when the clip 3 receives a force in the detaching direction, the neck portion 34c moves from the attachment hole 24 to the guide groove 26. The neck portion 34c abuts the second portions 28d of the distal ends 28e of the tongues 28. The second portions 28d receive the neck portion 34c, and the tongues 28 are deflected so as to move towards each other. The tongues 28 act as resistance to the detachment of the neck portion 34c from the clip mounting seat 102. As a result, it is possible to suppress inadvertent detachment of the clip 3 from the clip mounting seat 102.

When a further force is applied to the clip 3, the tongues 28 are deflected, and the neck portion 34c reaches the first portions 28c of the distal ends 28e. The first portions 28c are pushed by the neck portion 34c, and the tongues 28 are deflected so as to move away from each other. The first portions 28c have an angle causing them to be further directed to the guide groove 26 than the distal end 28a shown in FIG. 4. As compared with the distal end 28a shown in FIG. 4, it is more difficult for the distal ends 28e to offer resistance to the passing of the neck portion 34c through the guide groove 26. Thus, as compared with the embodiment of FIG. 4, it is possible for the neck portion 34c to be passed through the guide groove 26 by a smaller force. As compared with the embodiment of FIG. 4, the clip 3 can be detached from the first clip mounting seat 102 of the interior component 1 by a smaller force. Thus, plastic deformation of the tongues 28 is suppressed. As a result, it is possible to reuse the clip mounting seat 102.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

The interior component 1 may be a door trim or various other kinds of resin molding. The above embodiments may be applied to the attachment of various exterior components instead of the interior component 1.

The tongues 28 have the arcuate distal end 28a or the linear distal ends 28e. Alternatively, each tongue 28 may have a V-shaped distal end or a grooved distal end.

The clip attachment surface has a pair of tongues. Alternatively, the clip attachment surface may have one or more than two tongues.

This invention claims:

1. A clip mounting seat of an interior component or an exterior component comprising:
    a clip attachment surface;
    a peripheral wall extending from the clip attachment surface; and
    an opening configured to open a part of an outer peripheral edge of the clip attachment surface, wherein
    the clip attachment surface has:
    an attachment hole,
    a guide groove configured to guide an insertion of a neck portion of a clip from the opening into the attachment hole,
    a tongue protruding from an edge of the guide groove toward the attachment hole,
    the tongue configured to be deflectable to permit the neck portion to enter from the opening into the attachment hole,
    the tongue configured to be deflected by the neck portion in a closing direction to narrow a pass for suppressing the neck portion from being detached from the attachment hole when the neck portion moves from the attachment hole toward the opening
    wherein the tongue is configured to be deflected by the neck portion moving from the opening towards the attachment hole to abut a groove wall of the guide groove, and a gap into which the neck portion is inserted, at a time when the tongue abuts the groove wall of the guide groove, is smaller than a diameter of the neck portion.

2. The clip mounting seat of an interior component or an exterior component of claim 1, wherein the tongue has a first tongue and a second tongue.

3. The clip mounting seat of an interior component or an exterior component of claim 2, wherein the first and second tongues are configured to be deflected in an opening direction to move away from each other via the neck portion when the neck portion moves from the opening to the attachment hole.

4. The clip mounting seat of an interior component or an exterior component of claim 2, wherein the first and second tongues are configured to be deflected in the closing direction to move toward each other via the neck portion when the neck portion moves from the attachment hole to the opening.

5. The clip mounting seat of an interior component or an exterior component of claim 1, wherein the tongue has a distal end configured to abut the neck portion when the neck portion moves from the attachment hole to the opening, and wherein the distal end is provided with a recess directed towards the attachment hole.

6. The clip mounting seat of an interior component or an exterior component of claim 1, wherein the tongue has a distal end having an arc shape situated on an arc line in which an inner peripheral edge of the attachment hole is situated.

7. The clip mounting seat of an interior component or an exterior component of claim 1, wherein the tongue is formed in a linear configuration, and wherein the distal end is configured to be directed towards the attachment hole.

8. The clip mounting seat of an interior component or an exterior component of claim 1, wherein the tongue has:
- a first portion configured to be pushed by the neck portion such that the tongue is deformed to move towards the guide groove when the neck portion moves from the attachment hole to the opening by an applied first force, and
- a second portion configured to be pushed by the neck portion such that the tongue is deformed to move away from the guide groove when the neck portion moves from the attachment hole to the opening by an applied second force that is larger than the applied first force.

9. The clip mounting seat of an interior component or an exterior component of claim 1, wherein the tongue is provided with a protrusion protruding so as to reduce a groove width of the guide groove.

* * * * *